Oct. 10, 1944.   J. W. FLEMING   2,359,981
IRRIGATING SYSTEM AND DEVICE
Filed Oct. 2, 1943
Fig. 1.
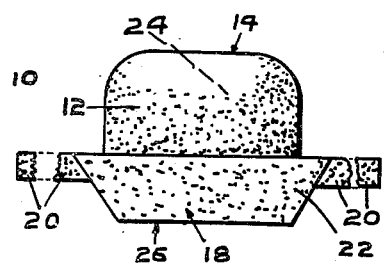
Fig. 2.
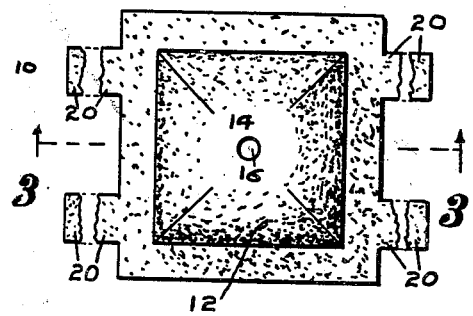
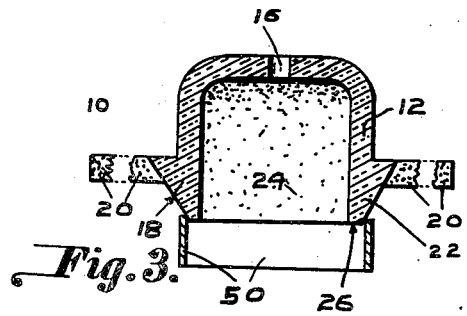
Fig. 3.
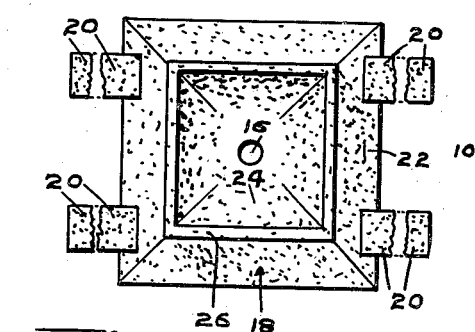
Fig. 4.
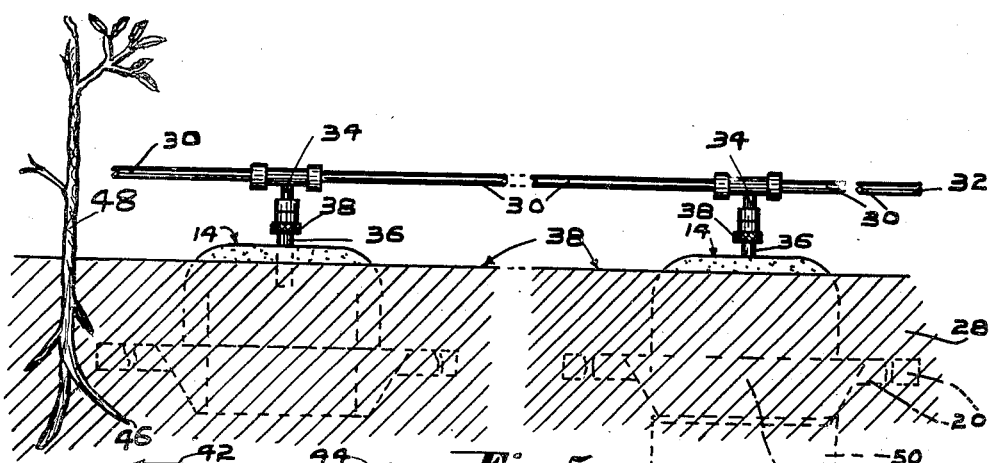
Fig. 5.
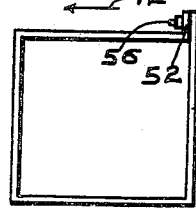
Fig. 6.
Inventor
J. W. Fleming
By Arthur H. Sturges
Attorney Patented Oct. 10, 1944

2,359,981

UNITED STATES PATENT OFFICE 2,359,981

IRRIGATING SYSTEM AND DEVICE

Joseph W. Fleming, Omaha, Nebr.

Application October 2, 1943, Serial No. 504,732

4 Claims. (Cl. 61—13)

The present invention relates to the gardening art and more particularly to an aerating and irrigating system therefor.

It is an object of the present invention to provide means for oxygenating soil adjacent the root systems of plants and shrubs, and more particularly to provide means for impregnating the soil of gardens and the like with moisture and to divergently and radially distribute the moisture from chambers provided underneath the surface of the soil.

A further object of the invention is to provide a simple construction for the above stated purposes which is economical in manufacture and easy of installation by unskilled labor.

Other and further objects and advantages of the invention will be understood from the following detailed description.

In the drawing:

Figure 1 is a side elevation of an irrigating receptacle employed.

Figure 2 is a top plan view thereof.

Figure 3 is a transverse section, the view being taken on line 3—3 of Figure 2, and also showing in section a skirt employed applied to the receptacle.

Figure 4 is a bottom plan view of the receptacle.

Figure 5 is a vertical section of a portion of a garden showing a shrub or the like growing therein, a plurality of the receptacles and a conduit connected to said receptacles, the latter being in a position of use, together with said skirt applied to one of said receptacles, said skirt being represented by dotted lines.

Figure 6 is a plan view of a skirt employed.

It is well known that at times when water is flushed on the surface of the soil of a garden, lawn or the like, an appreciable length of time is required for the moisture to seep to the roots of plants, shrubs, flowers and the like planted in said garden; and since heat from the rays of the sun evaporates water standing on the surface of the soil rapidly and wastefully, it is well known that the most advantageous time to water a lawn or garden is after sundown or during total darkness, whereby moisture has a chance to seep into the soil before the next morning's sun's rays evaporate said water. It is also well known that tender shrubs and grasses become scorched or burnt resultant from exposure to direct sunlight at times when water is sprinkled adjacent thereto upon the surface of the soil. The present invention aims to provide means for obviating the undesirable practice of the prior art and to provide means whereby gardens may be irrigated advantageously during the daytime and in strong sunlight as well as at other times.

Referring to the drawing for a more particular description, 10 indicates generally one of the receptacles of the present invention. Referring to Figures 1 to 4 inclusive, the receptacle 10 is preferably formed of concrete and preferably of rectangular contour in plan, having a main body portion 12 provided with a top 14, the latter having a medially disposed aperture 16 for purposes later described.

As best shown in Figures 1 and 3, the lower edge 18 of the receptacle extends below outwardly disposed arms 20, and for small gardens four of said arms are preferably employed for each receptacle, said arms being comparatively elongated for preventing the receptacle from sinking into the soil during use, as later described.

The arms 20 extend divergently from the lower portion 22 of the main body portion 12 of the receptacle. The lower portion 22 is of truncated conical shape in side elevation, as shown in Figure 1, and the upper surface of said lower portion 22 is in alignment with the upper surfaces of the arms 20 in use.

The interior 24 of the receptacle is in communication with the medially disposed aperture 16 of the main body portion 12. The lower portion 22 is provided with a lower edge 26.

In use a plurality of receptacles 10 is employed in accordance with the size of a garden to be irrigated and aerated, said receptacles being spaced apart in accordance with the character of the soil 28.

The numeral 30 indicates a preferably flexible conduit having an end 32. The latter during use is in communication with a source of supply of water under pressure, such as is provided by a standpipe in small towns and by the city water works in a metropolitan area.

The conduit 30 extends from said source of supply to each of the receptacles 10 placed within the garden. The conduit 30 is provided with T-outlets 34, one thereof being employed for each receptacle. The outlets 34 are each provided with a nozzle 36, which during use are disposed through the apertures 16 of their respective receptacles. Each nozzle 36 is provided with a manually rotatable cut-off valve 38 for regulating a flow of water under pressure through said nozzles.

In use the receptacles are placed in a garden in a manner whereby the upper edge portion 14 of each receptacle is substantially flush with the surface 38 of the soil 28, and it will be noted that chambers 40 are thus provided below the surface of the soil. When installed as above described, the water under pressure is caused to flow to said chambers within the interior 24 of the receptacles, the earth providing one wall of each chamber. By opening a valve, not shown, at the source, the water under pressure fills said chambers to any desired extent, whereupon the water seeps away from said chambers into the soil in all directions, as indicated by the arrows 42 and 44 in Figure 5, for conveying moisture to the roots 46 of the shrub or the like 48.

The arms 20 provide laterally disposed supports for preventing their respective receptacles from sinking too deeply into the soil in instances where said soil becomes soggy and said arms maintain the receptacles vertically disposed, as shown in Figure 5.

Referring to Figure 6, the latter shows in plan a skirt which may be formed of any suitable substance such as, for instance, strap iron, the latter being bent to a rectangular configuration in plan, said skirt 50 having ends 52 and 54 which are joined together preferably by means of a bolt 56.

During a casting or molding of the receptacle, a skirt 50 is employed for holding the molding forms together since a set of forms for a receptacle includes several sections. During use the skirt 50 is employed in instances where friable soils are encountered primarily. During installation one of the skirts 50, which may be of any desired height in a vertical direction, is buried in the ground adjacent the bottom edge 26 of any receptacle, as shown in Figure 3. Said skirts thus provide a vertically disposed wall about the bottom of the chambers 40, whereby should the operator open the valve on a nozzle 36 and thereby apply too great a force of water to the soil at the bottom of a chamber said skirt prevents water under pressure or a misdirected stream of water from disintegrating friable soils adjacent the bottom edge 26 of the receptacle 10 for aiding in a maintenance of the receptacle in the position shown in Figure 5, and also preventing water from flowing in a stream upwardly adjacent and past the arms 20.

As thus described it will be seen that an economical watering of plants may be consummated by noting the condition of the plants after a given number of gallons of water has been applied to a garden and by consulating the water meter in the cellar or basement of a house through which said water under pressure flows. By this means an operator may note how many gallons of water are required to water his garden under normal weather conditions; and in the event that he desires to water his garden shortly after a rainfall, when the soil is still somewhat moist, he may cause a fewer number of gallons of water to be applied to the garden than the normal amount required at times when his garden soil contains less moisture.

If desired the conduit 30 may be removed and folded up, and in instances where the system is installed in a garden positioned upon the side of a hill the operator may manipulate the valves 38 of the nozzles which are higher on said hill than the other nozzles for applying more or less water to the uphill side of the garden than is applied to the downhill side thereof.

It will also be noted that as thus described, I provide a means and system for watering gardens and the like which is substantially invisible; that each reservoir or receptacle may be operated separately or in unison with others as may be desired; and that an operator may water his garden by merely opening a single valve whereby his time and labor is conserved and water does not contact his clothing as heretofore.

From the foregoing description it is thought to be obvious that an irrigating system and device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. In an aerating and irrigating system for a garden or the like: a plurality of like receptacles each having an open side and an oppositely disposed closed side provided with an aperture disposed therethrough; said receptacles being adapted to be disposed in the soil of the earth with said open side downward, whereby the upper ends of said apertures are above the surface of said soil and chambers below said surface are provided; a conduit having a connection with a source of supply of water under pressure; said conduit having a nozzle outlet for each receptacle; said nozzles having terminal ends disposed through the apertures of the receptacles for conducting water from said source to said chambers; said receptacles being arranged in spaced apart relation with respect to each other; a valve on each nozzle for regulating the quantity of water conducted to each chamber; and a plurality of arms disposed outwardly and divergently from each receptacle for maintaining the upper ends of said apertures above said surface and preventing a decrease in the area of said chambers.

2. An aerating and irrigating device comprising a receptacle having an open side and an oppositely disposed closed side, the latter being provided with an aperture disposed therethrough, said receptacle being adapted to be buried in the soil of the earth in a manner whereby a chamber is provided and the walls of said aperture disposed approximately vertical, said aperture being adapted to receive water therethrough for filling said chamber therewith, and a plurality of arms disposed outwardly and divergently from the receptacle for preventing the latter from sinking into said soil unduly during use.

3. In a device as set forth in claim 1 which further includes a skirt disposed against and about the lower portion of the receptacle thereof said skirt extending beyond the lower edge of said receptacle.

4. An aerating and irrigating device comprising a receptacle having an open side and an oppositely disposed closed side, said closed side having an opening therethrough, said receptacle having a base of truncated conical form, a plurality of arms disposed outwardly and divergently from said receptacle, the upper surface of said base portion being in alignment with the upper surfaces of said arms, said receptacle adapted to be buried in the soil to provide a chamber in vertical alignment with the opening in the closed side of the receptacle, said opening adapted to receive a conduit in connection with a water supply.

JOSEPH W. FLEMING.